T. E. MURRAY.
METAL VEHICLE WHEEL.
APPLICATION FILED JUNE 28, 1916.

1,274,930.

Patented Aug. 6, 1918.

Inventor
Thomas E. Murray
By his Attorney

UNITED STATES PATENT OFFICE.

THOMAS E. MURRAY, OF NEW YORK, N. Y.

METAL VEHICLE-WHEEL.

1,274,930.  Specification of Letters Patent.  Patented Aug. 6, 1918.

Application filed June 28, 1916. Serial No. 106,316.

*To all whom it may concern:*

Be it known that I, THOMAS E. MURRAY, a citizen of the United States, residing at New York, in the county of New York and State of New York, have invented a certain new and useful Improvement in Metal Vehicle-Wheels, of which the following is a specification.

The invention relates to vehicle wheels of sheet metal and consists in the construction of the inner ends of the tubular spokes in the form substantially of wedge frusta, having flat inclined faces or sides, united together solely by electric welding to form a wheel nave.

In the accompanying drawings—

Figure 1:
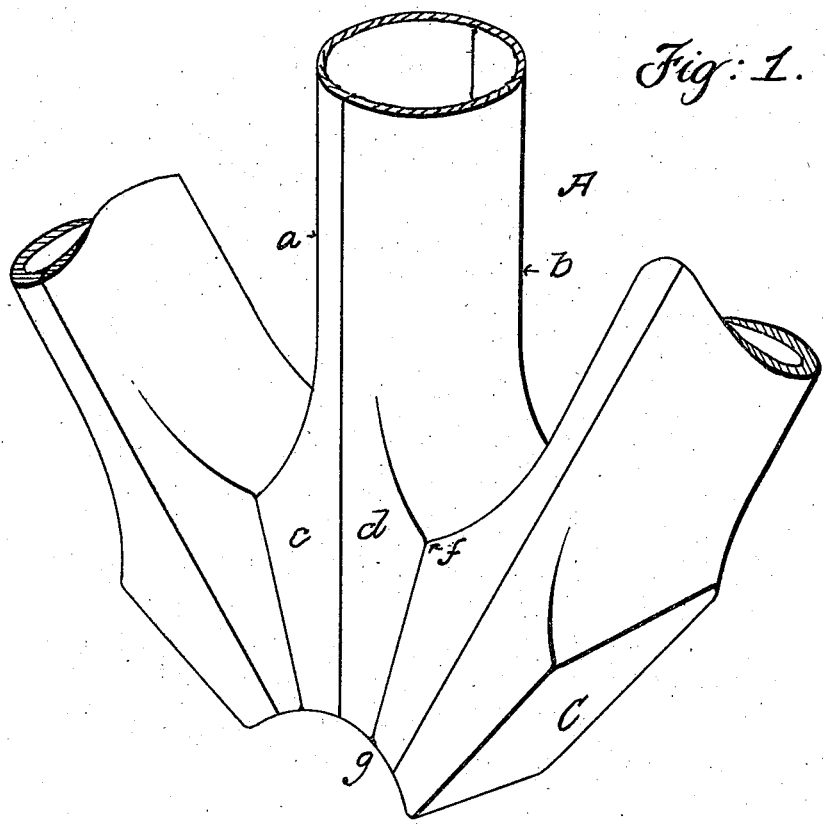
Figure 2:
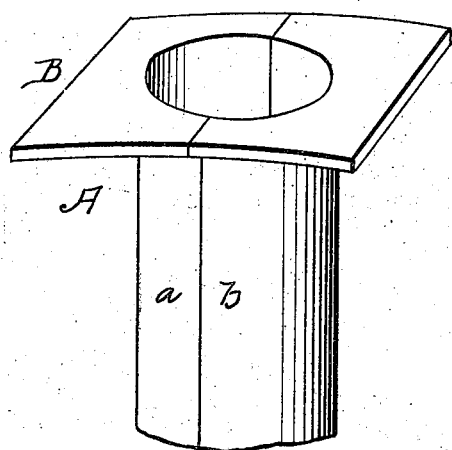

Figure 1 shows in perspectives the inner ends of three spokes united. Fig. 2 shows the outer end of one of the tubular spokes flanged for attachment to a rim.

Similar letters of reference indicate like parts.

Each spoke A is tubular and is preferably formed in two longitudinal half sections $a, b$, each section being struck up, pressed or stamped separately from sheet metal, and the two half sections being united at their longitudinal edges. The inner end of each half section is enlarged to form one half of a wedge frustum as shown at $c, d$, the complete frustum being produced when said spoke sections are united. When the spokes are assembled the inclined flat sides or faces C of said inner spoke portions meet, and are homogeneously united solely by electrically welding the flat face of one spoke to the flat face of the next adjacent spoke over the area of said contacting flat faces, the joint being indicated at $f, g$. Said wedge frusta then unitedly form a circular nave for the wheel.

By reason of the electrical welding of two contacting plates of metal each forming an inclined side C, said two plates become one plate. That is to say, the metal when traversed by the current not merely becomes plastic or adhesive at the surfaces, but is there dissociated or molecularly intermingled so that after completion it is impossible to recognize the existence of the joint by physical tests of comparative strength at the joint and elsewhere. Any mechanical means for fastening or interlocking the contacting surfaces is, therefore, not as efficient as the electrically welded joint.

I am aware that spokes have been disclosed wherein frusto wedge shaped end portions have had their inclined sides formed with tongues or projections and grooves or recesses adapted to interlock or interengage with each other, and also with transverse grooves adapted to receive locking pins or rivets, which pins are riveted in place or welded up by a blow pipe or which grooves receive molten metal to form rivets, but I am aware of no instance in the prior art where said inclined sides are made flat and united solely by electrical welding as hereinbefore described.

I claim:

A vehicle wheel of sheet metal, comprising a plurality of tubular spokes, each spoke being formed in two longitudinally divided similar, interchangeable sections, electrically welded at their meeting edges, and each spoke having an inner end portion of frusto-wedge-shape having flat inclined sides with plane faces, the said flat inclined sides of adjacent spokes being placed in registering contact to form a wheel nave and united one to the other solely by electrically welded joints.

In testimony whereof I have affixed my signature in presence of two witnesses.

THOMAS E. MURRAY.

Witnesses:
 GERTRUDE T. PORTER,
 MAY T. McGARRY.